Patented Feb. 9, 1926.

1,572,479

UNITED STATES PATENT OFFICE.

GRANT HAMMOND, OF NEW HAVEN, CONNECTICUT.

COMPOSITION OF INGREDIENTS AND PROCESS FOR DEINKING PAPER.

No Drawing.   Application filed May 24, 1922.   Serial No. 563,381.

*To all whom it may concern:*

Be it known that I, GRANT HAMMOND, a citizen of the United States, and a resident of New Haven, in the county of New Haven and State of Connecticut, have invented a new and Improved Composition of Ingredients and Process for Deinking Paper, of which the following is a specification.

My invention relates to a preparation employed for removing the ink from newspapers and the like, and to the process for effecting this result, and an object of my invention, among others, is to provide a composition that will thoroughly remove the ink from the paper without injury to the fibers of such paper and without discoloration of such paper.

My improved composition comprises a saponaceous substance combined with an ingredient having the properties of sugar that may be mixed in various quantities. In developing my process I have found naphtha soap to satisfactorily answer my purpose, such soap being combined with glucose, and these ingredients may be used in various quantities. I have found that satisfactory results may be produced with the use of one-half the quantity of soap in bulk to that of the glucose, these being dissolved with quite a large quantity of water. I have found that approximately one-eighth ounce of naphtha soap combined with one-sixteenth ounce of glucose dissolved in one quart (approximately 2.08 pounds) of water will be sufficient to treat two ounces of newspaper.

While I prefer to use naphtha soap, any other saponaceous substances may be employed, either in the cake, powdered, chip or other form, and in place of the glucose glycerine may be used, or any of the sugars or other carbohydrates including dextrine. These substances may be classified as water soluble organic materials having a sweet taste, but, as above set out, economy will be subserved if naphtha soap and glucose are employed in substantially the quantities above mentioned.

In carrying out my process the paper to be treated is submerged in the mixture in a proper receptacle within which the mass is agitated until the paper is disintegrated. The bottom of the receptacle, which may be perforated, is opened and the mass is stirred until most of the water is drained off. The receptacle is again filled with cold water, the mass again agitated and the water is then again run off, after which the mass is washed for a time in running water.

The paper will now be found to have been reduced to a pulp suitable for immediate treatment in a paper making machine to be reformed into paper in the ordinary manner.

In action of the preparation upon the paper the soap acts upon and releases the linseed oil or binder in the ink and with the other ingredients holds this in suspension.

In accordance with the provisions of the patent statutes I have described the principles of operation of my invention, with the process which I now consider to represent the best embodiment thereof; but I desire to have it understood that the process described is only illustrative, and that the invention may be carried out by other means.

I claim:—

1. A composition for de-inking paper including a saponaceous ingredient and a water soluble organic compound having a sweet taste, the whole being combined with water.

2. A composition for de-inking paper including a saponaceous ingredient and an ingredient of the glucose series all combined with water.

3. A composition for de-inking paper including a saponaceous ingredient and glucose all combined with water.

4. A composition for de-inking paper including a saponaceous ingredient of a certain amount combined with one-half the amount of glucose, the whole combined with water in comparatively large quantities.

5. A composition for de-inking paper including a saponaceous ingredient in the proportion of approximately one-eighth ounce to approximately one-sixteenth ounce of glucose, the whole combined with substantially 2.08 pounds approximately of water.

6. The process of de-inking paper that consists in agitating the paper in a solution comprising a saponaceous ingredient combined with an ingredient of the glucose class and water, then draining off the water, and then washing the remaining pulp.

7. The process of de-inking paper that consists in agitating paper in a solution in substantially the proportions of approximately one-eighth ounce of saponaceous ingredient to approximately one-sixteenth ounce of an ingredient of the glucose series, and then washing the pulp after such treatment.

8. A composition for de-inking paper consisting of an ink dissolving substance and a substance having the properties of a sugar, all combined with water.

9. A composition for de-inking printed paper including a saponaceous ingredient and an ingredient having the properties of a sugar, all combined with water.

10. A process for de-inking printed paper which comprises immersing printed paper in a water solution of glucose and alkali soap thereby loosening the pigment of the printing and dissolving the binder, draining off the solution and washing the mass with water.

GRANT HAMMOND.